O. P. PENCE.
Fruit Dryer.
No. 108,048. Patented Oct. 4, 1870.
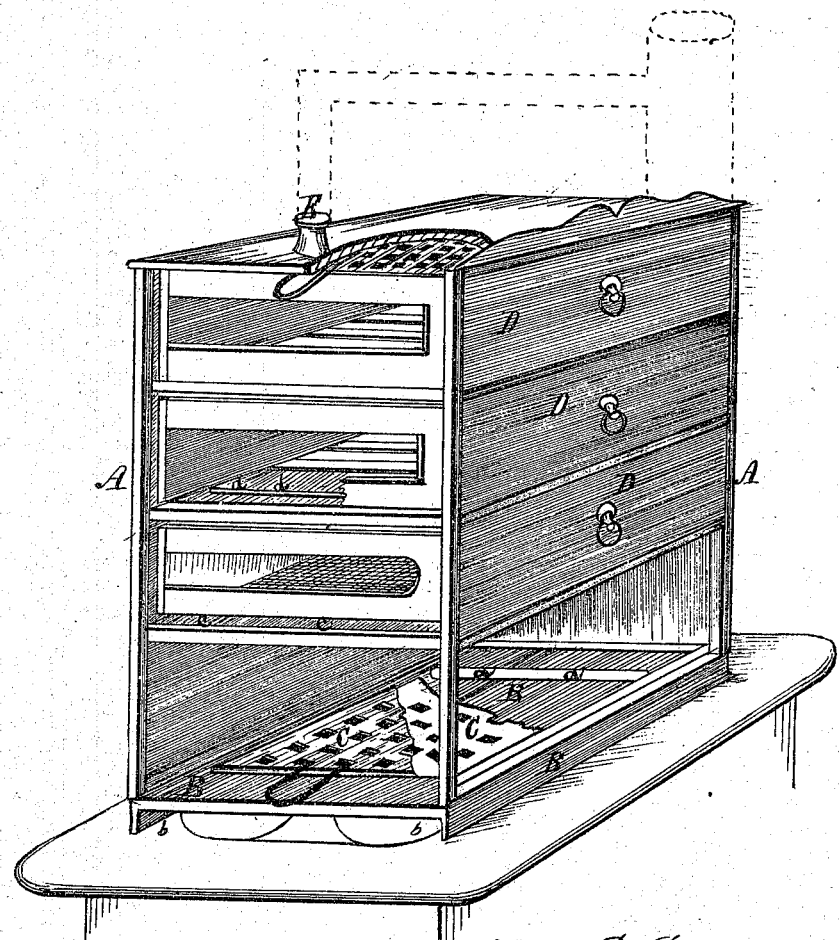
Witnesses.
W. W. Pierce
W. D. Booton
Oliver P. Pence
Inventor.
Thomas G. Orwig
Attorney.

United States Patent Office.

OLIVER P. PENCE, OF DES MOINES, IOWA.

Letters Patent No. 108,048, dated October 4, 1870.

IMPROVEMENT IN FRUIT-DRIERS.

The Schedule referred to in these Letters Patent and making part of the same.

I, OLIVER P. PENCE, of Des Moines, in the county of Polk and State of Iowa, have invented and Improved Portable Fruit-Drier, of which the following is a specification.

My invention consists in arranging movable drawers in a case in such a manner that they can be placed over a heated stove, or metal plate, and the hot air made to pass through and around them, for the purpose of drying fruit, or anything that may be placed in the drawers.

The drawing is a perspective view of my portable drier, with one end open and the first or lower drawer removed.

A A is the body of the case, made of wood.

B B B is a metal base, closed on three sides and open at $b$ $b$. It also has an opening at $a$ $a$, where the hot air is allowed to pass upward to the drawers.

The metal base rests on the top of the stove, or metal plate, when in use, and serves to conduct the hot air and to preserve the wooden case from burning.

C C represent two metal perforated plates.

The upper one has a handle attached, which projects through the end of the case, and can be thereby moved upon the under perforated plate, so as to open or close the perforations. By this means the draught of hot air can be easily regulated.

A corresponding pair of plates are placed in the upper part of the case over the drawers, and operated in the same manner and for the same purposes.

D D D represent the movable drawers in place. Three different kinds of drawer bottoms are used in my model, showing that perforated sheet-metal, wire, and wood, may be used.

E is the pipe through which the steam and hot air escapes. The dotted lines show how it may be conducted into the stove-pipe. By this arrangement a strong draught will be obtained, and all the steam and fumes carried from the room where the drier is in use In the open air the pipe can be extended upward sufficiently to create enough draught.

$c$ $c$ is a wooden bottom, placed under the second drawer, to aid in distributing and circulating the hot air. At the end where it is shown it is fitted to the three sides of the case. At the opposite end, (not shown,) it is open sufficiently to allow the hot air to pass upward.

The bottom or heat-distributer $d$ $d$, under the third drawer, is made like the other, excepting that the opening is at the opposite end.

My portable drier may be made of various forms and sizes.

I am aware that drying-boxes and drawers of various kinds are in use. But a simple portable drier, in which fruit can be dried in three hours, and which is adapted for use on a stove in the house, or on a stove or plate out doors, and which is provided with a complete and simple means of regulating the hot air, is new.

When all of the drawers are filled with fruit, and that in the lower ones dries more rapidly than in the upper ones, their position may be changed.

Claim.

I claim as my invention—

The case A A, the metal base B B B, the perforated plates C C, the movable drawers D D D, the pipe E, the heat-distributers $c$ $c$ and $d$ $d$, all made, combined, and operated, substantially as described, and for the purposes specified.

his
OLIVER P. × PENCE.
mark.

Witnesses:
J. F. C. HAYES.
G. F. WALKER.